US006278832B1

(12) United States Patent
Zagumennyi et al.

(10) Patent No.: US 6,278,832 B1
(45) Date of Patent: Aug. 21, 2001

(54) SCINTILLATING SUBSTANCE AND SCINTILLATING WAVE-GUIDE ELEMENT

(75) Inventors: Alexander Iosifovich Zagumennyi; Yury Dmitrievich Zavartsev; Pavel Alekseevich Studenekin, all of Moscow (RU)

(73) Assignee: TASR Limited, Nassau (BS)

( * ) Notice: Subject to any disclaimer, the term of this patent is extended or adjusted under 35 U.S.C. 154(b) by 0 days.

(21) Appl. No.: 09/380,839

(22) PCT Filed: May 27, 1996

(86) PCT No.: PCT/RU98/00156

§ 371 Date: Sep. 10, 1999

§ 102(e) Date: Sep. 10, 1999

(87) PCT Pub. No.: WO99/35512

PCT Pub. Date: Jul. 15, 1999

(30) Foreign Application Priority Data

Jan. 12, 1998 (RU) ................................. 98101544

(51) Int. Cl.⁷ ............................... G02B 6/00; G02B 6/10; C30B 11/10; G01T 1/24; C09K 11/06
(52) U.S. Cl. ............................. 385/141; 117/12; 117/13; 250/370.11; 250/483.1; 252/301.17; 385/12; 385/129
(58) Field of Search .................. 252/301.17, 301.36, 252/301.4; 250/301, 361, 370.01, 370.11, 370.12, 483.1, 486.1, 269.6; 385/12, 141, 142, 146, 129; 501/95, 95.1; 171/12, 13

(56) References Cited

U.S. PATENT DOCUMENTS

| 4,413,184 | 11/1983 | Marrone ................................. 250/368 |
| 4,733,940 | 3/1988 | Broer et al. ........................... 385/123 |
| 4,958,080 | 9/1990 | Melcher .............................. 250/483.1 |

(List continued on next page.)

FOREIGN PATENT DOCUMENTS

| 0 350 391 | 1/1990 | (EP) | ............................... C09K/11/79 |
| 0 456 002 | 11/1991 | (EP) | ............................... G01T/1/202 |
| 2 637 088 | 3/1990 | (FR) | ................................. G01T/1/20 |
| 1122113 | 4/1992 | (RU) | ................................. G01T/1/20 |

OTHER PUBLICATIONS

L.V. Viktorov et al., "Nonorganic Scintillator Materials", Neorganicheskie Materialy, vol. 27, No. 10, pp. 2005–2029, (1991).

J.D. Naud et al., "The Role of Cerium Sites in the Scintillation Mechanism of LSO", IEEE Transactions on Nuclear Science, vol. 43, No. 3, pp. 1324–1328, (1996).

(List continued on next page.)

Primary Examiner—Scott J. Sugarman
Assistant Examiner—David N. Spector
(74) Attorney, Agent, or Firm—Finnegan, Henderson, Farabow, Garrett & Dunner, LLP

(57) ABSTRACT

The invention is related to nuclear physics, medicine and oil industry, namely to the measurement of x-ray, gamma and alpha radiation; control for trans uranium nuclides in the habitat of a man; non destructive control for the structure of heavy bodies; three dimensional positron-electron computer tomography, etc.

The essence of the invention is in additional ingredients in a chemical composition of a scintillating material based on crystals of oxyorthosilicates, including cerium Ce and crystallized in a structural type $Lu_2SiO_5$.

The result of the invention is the increase of the light output of the luminescence, decrease of the time of luminescence of the ions $Ce^{3+}$, increase of the reproducibility of grown crystals properties, decrease of the cost of the source melting stock for growing scintillator crystals, containing a large amount of $Lu_2O_3$, the raise of the effectiveness of the introduction of SCintillating crystal luminescent radiation into a glass waveguide fibre, prevention of cracking of crystals during the production of elements, creation of waveguide properties in scintillating elements, exclusion of expensive mechanical polishing of their lateral surface.

6 Claims, 3 Drawing Sheets

U.S. PATENT DOCUMENTS

| | | | |
|---|---|---|---|
| 5,264,154 | | 11/1993 | Akiyama et al. ............... 252/301.4 F |
| 5,313,504 | * | 5/1994 | Czirr ................................... 376/153 |
| 5,690,731 | * | 11/1997 | Kurata et al. .......................... 117/13 |

OTHER PUBLICATIONS

V.N. Belousov, (translator), of W. Brunner et al., "Wissensspreicher Lasertechnick", VEB Fachbucherverlag Leipzig, p. 395, (1987).

E.G. Devitsin et al., "Luminescent Properties of $Lu_3Al_5O_{12}$ Crystal Doped with Ce", Conference on Scintilators (Scint'95), Deltt, The Netherlands, (1995).

I.I. Anthony et al., "The Growth of Shaped Single Crystals and Products by the Stepanov Method", Lenigrad, "Nauka", pp. 30–31, (1981).

G.I. Babkin et al., "Crystallization Stability During Capillary Shaping", Journal of Crystal Growth 50, pp. 45–50, (1980).

V.A. Tatarchenko, "Capilary Shaping in Crystal Growth from Metals", Journal of Crystal Growth 37, pp. 272–284, (1977).

G.V. Anan'eva et al., "Growth of Lanthanide Oxyortosilicate Single Crystals and Their Structural and Optical Characteristics", Izvestiaya Akademii Nauk SSSR, Neorganicheskie Materialy, vol. 17, No. 6, pp. 1037–1042, (1981).

G.B. Loutts et al., "Czochralski Growth and Characterization of $Lu_{1-x}Gd_x)_2SiO_5$ Single Crystals for Scintillators", Journal of Crystal Growth, 174, pp. 331–336, (1997).

A. Lempicki et al., "Ce–doped Scintillators: LSO and LuAP", Nuclear Instruments and Methods in Physics Research, Section A, vol. 416, pp. 333–344, (1988).

A.H. Gomes de Mesquita et al., "Preparation and Cathodoluminescence of $Ce^{3+}$–Activated Yttrium Silicates and Some Isostructural Compounds", Materials Research Bulletin, vol. 4, No. 9, pp. 643–650, (1969).

* cited by examiner

SCINTILLATING SUBSTANCE AND SCINTILLATING WAVE-GUIDE ELEMENT

FIELD OF INVENTION

The invention is related to nuclear physics, medicine and oil industry, namely to scintillating materials, and is meant for: registration and measurement of an x-ray, gamma and alpha radiation; control for trans uranium radio nuclides in the habitat of a man (in particular, in the zones of Chernobyl catastrophe); sparing (non-destructive) control of the structure of hard bodies; three dimensional positron-electron computer tomography and x-ray computer fluorography without the use of photo films; as well as for the control of the level of liquid in oil reservoirs.

DESCRIPTION OF RELATED ART

Known is the material of lutetium oxyorthosilicate with cerium $LU_{2(1-x)}Ce_{2x}SiO_5$ where x is varying in the range from $2\times10^{-4}$ to $3\times10^{-2}$ (U.S. Pat. No. 4,958,080: date of Patent Sept. 18, 1990, "Lutetium orthosilicate single crystal Scintillator detector", Inventor C. I. Melcher, W. Redding Assignee: Schlumberger Technology Corp., as well as Victorov L. V., Skorikov V. M., Zhukov V. M., Shulgin B. V. "Inorganic scintillating materials", Published by the Academy of Sciences of the USSR, series Inorganic materials, volume 27, N 10, pages 2005–2029, 1991). These scintillating crystals $Lu_{2(1-x)}Ce_{2x}SiO_5$ have a number of advantages compared to other crystals: bigger density, high atomic number, relatively low refractive index, high light output, short time for scintillations decay. The drawback of the known scintillating material is a big scattering of the most important scintillating parameters:

the value of a light output, the position of a luminescence maximum and time of luminescence. This is explicitly demonstrated by experimental results (J. D. Naud, T. A. Tombrello, C. I. Melcher, J. S. Schweizer "The role of cerium sites in the scintillation mechanism of LSO" IEEE transactions on nuclear science, vol. 43, N 3, (1996), p. 1324–1328.)

The scattering of scintillating elements patameters of lutetium oxyorthosilicate with cerium is the result of a small coefficient of cerium ions distribution between a growing crystal and melt ($Kc_e=0.25$), as a result of which a boule, grown by Czochralski method, has a concentration of cerium which is several times higher in the lower part than in the upper one. This brings about the fact that the light output of samples luminescence is 2–5 times lower in the lower part than in the top part, and the decay time is increased from 41 ns to 50 ns. Such scattering of parameters allows to use only a small part of a crystal boule for the production of scintillating elements.

As a prototype for the proposed invention it is possible to select scintillating crystals of the company Hitachi Chemical Co. Ltd. (Tokyo, Japan), having the composition, represented by the following chemical formula $Gd_{2-(x+e)}Ln_xCe_ySiO_5$, where Ln=Sc, Tb, Dy, Ho, Er, Tm, Yb and $0.03 \leq x \leq 1.9$, $0.00 \leq y \leq 0.2$ (European patent ER 0456 002B1: Date of publication Jun. 11, 1996 "Single crystal scintillator and apparatus for prospecting underground strata using same". Inventor S. Akiyama, T. Utsu, H. Ishibashi, C. I. Melcher, J. S. Schweizer, Assignee: Hitachi Chemical Ltd., as well as U.S. Pat. No. 5,264,154: date of Patent Mar. 11, 1996, "Single crystal scintillator", Inventor S. Akiyama, H. Ishibashi, T. Utsu, C. I. Melcher, J. S. Schweizer, Assignee: Hitachi Chemical Co. Ltd).

In prototype crystals it is possible to substitute a $Gd^{3+}$ ion with a big radius for an ion with a small radius, for example, for $Lu^{3+}$ ion. This allows to control some scintillation parameters, in particular, to shift a maximum peak of luminescence from 430 nm up to 416 nm—in the field of a greater sensitivity of photoelectronic multipliers. The change of prototype crystals composition also allows to smoothly change their density and to decrease the time of luminescence for $Ce^{3+}$ ions up to 30 ns. Even with a non-significant content of Gd in melt ~20 mol %, it is possible to increase the homogeneity of the crystals grown, because of the increase of cerium ions distribution coefficient.

The drawbacks of the prototype are the decrease of the light output of luminescence and of effective atomic number, compared to known crystals of lutetium oxyorthosilicate. Comparison of the light output of the prototype with the known crystals of $Ce_{2-x}Lu_{2(1-x)}SiO_5$ are made by the authors of the given invention and are summed up in table 1 (G. B. Loutts, A. I. Zagumennyi, S. V. Lavrishchev, Yu. D. Zavartsev, and P. A. Studenikin "Czochralski growth and characteristics of $(Lu_{1-x}Gd_x)_2SiO_5$ single crystals for scintillators". J. Crystal Growth, Vol. 174 (1997), p. 331–336).

To the drawbacks of the prototype can also be referred that with the content of Gd of more than 50 at. % in the melt, these materials are crystalized in a monoclinic syngony with the spatial group $P2_1/c$, Z=4.

In crystals with such a spatial group, deterioration of scintillation characteristics of ion $Ce^{3+}$ is observed, compared to known crystals of $Ce_{2-x}Lu_{2(1-x)}SiO_5$, which are crystallized in a structural type with a spatial group B2/b, Z=8. So, for example, in crystals with a spatial group $P2_1/c$ observed are: the increase of a constant for the time of scintillations decay $\tau$ up to 50–60 ns; the displacement of the peak of luminescence up to 430–440 nm, where the sensitivity of electronic photomultipliers is less. One more essential drawback of crystals with a spatial group $P2_1/c$ is a strong cracking during crystal boule cutting and their polishing, which sharply increase the cost of manufacturing elements of the size 2 mm×2 mm×15 mm for three dimensional positron-electron tomography with the resolution of 8 $mm^3$.

The essential technical drawback of known scintillating crystals $Ce_{2-x}Lu_{2(1-x)}SiO_5$ and crystals of the prototype is the growing of crystals from melting stock, containing an extremely expensive reagent $Lu_2O_3$ with the chemical purity of not less than 99.99%. The common drawback of these materials is also the impossibility of creating scintillating waveguide elements at the expense of refractive index gradient along the waveguide cross section.

SUMMARY OF INVENTION

The technical task of the invention is the increase of the light output of luminescence, decrease of the time of luminescence of ions $Ce^{3+}$, increase of the reproducibility of properties of grown single crystals, decrease of the cost of source melting stock for growing crystals scintillators, contained in great amount of $Lu_2O_3$, the extension of the arsenal of technical facilities, implementing scintillating properties, the increase of effectiveness of the introduction of scintillating crystal luminescent radiation into glass waveguide fibre. In specific forms of implementation the task of the invention is also the prevention of crystals cracking during cutting and manufacturing scintillation elements, creation of waveguide properties in scintillation elements at the expense of refractice index gradient along its cross section, exclusion of expensive mechanical polishing of the lateral surface of scintillating crystals at the stage of their growth.

The technical result is achieved due to the growing of crystals in a structural type $Lu_2SiO_5$ with a spatial group B2/b (Z=8), as well as at the expense of an advantageous content of $Ce^{3+}$ ions in a crystal. As our research has shown, oxyorthosilicates are crystallized with a spatial group B2/b only in the case if the content of lutetium in a crystal is not less than 50 at. % and/or the parameter of a scintillating material lattice does not exceed the following maximum values: a=1.456 nm; b=1/051 nm; c=0.679 nm; β=122.4°.

In crystals with a spatial group B2/b (Z=8) an anomaly high scintillating light output for ions $Ce^{3+}$ is observed, compared to all other known compositions of silicates, which as a rule have 2–5 times less light output during gamma excitation.

The share of x-ray radiation, transformed into the energy of primary electrons, and especially the effectiveness of interaction of gamma—quantum with the material of a scintillator, approximately depends in proportion to the cube of effective atomic number. For γ—quanta with the energy of $E_\gamma \leq 1.022$ MeV, interaction of γ quanta with the material of a scintillating crystal takes place due to the process of photo effect, non coherent and coherent scattering. With the energies exceeding a doubled energy of electrons state of rest (Eγ>1.022 MeV), a process of formation of electron—positron pairs is also added. It is supposed that in the formation of a pair each of interacted primary γ quanta gives birth to at least three secondary scattered γ quanta. Two of which having an energy of 0.511 MeV each, and represent radiation, appearing in electron and positron annihilation. It is obvious from that that in a three dimensional positron-electron tomography it is preferable to use scintillating crystals with a greater effective atomic number. In the process of crystal growth heavy ions of $Lu^{3+}$ which are replaced by lighter admixture ions $Me^{1+}$, $Me^{2+}$, $Me^{3+}$, $Me^{4+}$, $Me^{5+}$, $Me^{6+}$, can cause the growth of a crystal with a smaller density of 7.2–7.4 $g/cm^3$, and atomic number Z=58–63. In growing large crystal boules by the method of Czochralski for compensating the charge and for the correction of effective atomic number, it is preferable to use heavy ions $Hf^{4+}$, $Ta^{5+}$ and $W^{6+}$, which prevents the changing of physical parameters (density, refractive index) along the diameter of large crystals (40–80 mm) and additionally allows to receive crystals with identical scintillation parameters, i.e. to increase the reproducibility of properties of scintillating elements, which are manufactured from grown single crystals.

The spatial group B2/b (z=8) contains 64 ions in an elemental unit, in particular 8 ions of lutetium of the first type ($Lu_1$) and eight ions of lutetium of the second type ($Lu_2$). The energy of substitution $Ce^{3+} \Rightarrow Lu_1$ is equal to +6.90 eV, and the energy of substitution of $Ce^{3+} \Rightarrow Lu_2$ is equal to +7.25 eV. In both the cases the energy of substitution is positive, as ion radius $Ce^{3+}$ is greater than the ion radius $Lu^{3+}$. Different displacement of oxygen ions after the substitution of $Ce^{3+} \Rightarrow Lu_1$, $Lu_2$ in coordination polyhedron $LuO_7$ and $LuO_6$ determine principally different scintillation characteristics of the material. The light output, the position of the luminescence maximum and the constant of time for scintillations decay (time of luminescence) depend on the number of $Ce^{3+}$, which substituted ions $Lu_1$ and/or ions $Lu_2$. So, in gamma excitation both centres of luminescence are always excited and luminescence simultaneously, and the constant of time for scintillations decay will depend both on the duration of luminescence of the first and second centres, and on the relationship of the concentration of ions of $Ce^{3+}$ in coordination polyhedrons $LuO_7$ and $LuO_6$. The centre of luminescence $Ce_1$ (polyhedron $LuO_7$) has the time of luminescence of 30–38 ns and the position of the luminescence maximum 410–418 um. The centre of luminescence $Ce_2$ (polyhedron $LuO_6$) has the time of luminescence of 50–60 ns and the position of maximum luminescence of 450–520 nm. The maximum technical result is observed in scintillating crystals containing ions $Ce^{3+}$ only in coordination polyhedrons $LuO_7$. The simultaneous presence of $Ce^{3+}$ ions in $Lu_7$ and $LuO_6$ decreases the light output 3–10 times, increasing the time of luminescence up to 40–50 ns and shifts the luminescence maximum into the area of less sensitivity of photo electron multipliers. The crystals containing ions of $Ce^{3+}$ advantageously in coordination polyhedrons $Lu_7$ are received from the melt additionally doped with ions of the following elements: Zr, Sn, Hf, As, V, Nb, Sb, Ta, Mo, W. By that, ions Ti, Zr, Sn, Hf, Nb, Sb, Ta occupy in the crystal lattice the position with octahedral coordination (polyhedron $LuO_6$) due to higher bond energies of these ions. For example, ions As, V, Mo, W, occupy tetrahedral positions, however with that the octahedral positions are strongly distorted.

Additional technical result is achieved by the use as a source reagent of $Lu_2O_3$ with the purity of 99.9% (or less) instead of reagent $Lu_2O_3$ with a purity of 99.99% and purity of 99.999% used in the prototype, which allows to decrease the cost of a melting stock for growing crystals 2.5–3 times. Some admixtures in the source reagent $Lu_2O_3$ with the purity of 99.9% (or less) can decrease the light output of luminescence 2–10 times. The decrease of the light output occurs due to the formation of $Ce^{4+}$ ions in heterovalent substitution which takes place during the growth of crystal on the background of crystallization. Below listed are the simplest schemes of substitution:

(1) $Lu^{3+}+Si^{4+} \Rightarrow Ce^{3+}+Si^{4+}$—optimal substitution of lutetium ions by cerium ions.
(2) $Lu^{3+}+Si^{4+} \Rightarrow Ce^{+4}+Me^{3+}$—highly probable, harmful and undesirable heterovalent substitution with the compensation of charge for admixtures $Me^{3+} \leq$ Be, B, Al, Cr, Mn, Fe, Co, Ga, In.
(3) $2Lu^{3+} \Rightarrow Ce^{4+}+Me^{2+}$—highly probable, harmful and undesirable heterovalent substitution with the compensation of charges for admixtures $Me^{2+}$=Mg, Ca, Mn, Co, Fe, Zn, Sr, Cd, Ba, Hg, Pb.
(4) $3Lu^{3+} \Rightarrow Ce^{+4}+Ce^{+4}+Me^{1+}$—probable harmful and undesirable heterovalent substitution with the compensation of charge at big concentrations of cerium ions for admixtures $Me^+$=Li, Na, K, Cu, Rb, Cs, Tl.

However, the additional introduction into the melt of at least one of chemical compounds (for example, oxide) of the elements of the group Zr, Sn, Hf, As, V, Nb, Sb, Ta, Mo, W in the amount 2–3 times greater than the summary concentration in atomic percent of admixture ions ($Me^+ + Me^{3+} + Me^{3+}$) eliminated the formation of $Ce^{+4}$ ions in the process of the crystal growth. This related to the fact that at the background of crystallization there takes place a heterovalent substitution according to energetically more beneficial schemes with the compensation of charge (5) $Lu^{3+}+Si^{4+} \Rightarrow Me^{2+}+Me^{5+}$
(6) $Lu^{3+}+Si^{4+} \Rightarrow Me^{+}+Me^{6+}$
(7) $Lu^{3+}+Si^{4+} \Rightarrow Me^{4+}+Me^{3+}$ In the specific form of invention implementation the technical result, expressed in the prevention of crystals cracking during cutting and manufacturing of scintillating elements is achieved by way of additional introduction into the material of at least one of the elements of the group H, F, Li, Be, B, Na, Mg, Al, K, Ca, Ti, V, Cr, n, Fe, Co, Ni, Cu, Zn, Ga, Ge, As, Rb, Sr, Zr, Nb, Mo, Ag, Cd, In, Sn, Sb, Cs, Ba, Hf, Ta, W, Hg, Tl, Pb, Bi.

Crystalline boules, containing heterovalent micro admixtures with a non compensated charge, are responsible for cracking in the process of growth of a crystal and its cutting. That is why, for example, the addition into a scintillating material of a necessary quantity of ions, having the degree of oxidation of +4, +5, +6 (for example, Zr, Sn, Hf. As, V, Nb, Sb, Ta, Mo, W, Th) allows to prevent the cracking of crystals in the process of growth, as well as during cutting single crystal boules and manufacturing elements. The above ions in an optimal concentration provide for the heterovalent substitution with the compensation of charge according to equation (5), (6), (7).

Independent technical result—the creation of waveguide properties in a waveguide element along its cross section is achieved irrespective of spatial structure of oxyorthosilicate being crystallized, i.e. independently of the content of lutetium in a crystal because of the additional, compared to the prototype, content in a scintillating material of at least one elements of the group: H, F, Li, Be, B, C, N, Na, Mg, Al, P, S, Cl, K, Ca, Ti, V, Cr, Mn, Fe, Co, Ni, Cu, Zn, Ga, Ge, As, Se, Rb, Sr, Zr, Nb, Mo, Ru, Rh, Pd, Ag, Cd, In, Sn, Sb, Cs, Ba, Hf, Ta, W, Re, Os, Ir, Pt, Au, Hg, Tl, Pb, Bi, U, Th. While the availability in the central part of a scintillating element of ions F and/or H, Li, Be, B, C, N, Na, Mg, Al, P, S, Cl, K, Ca, Ti, V, Cr, Mn, Fe, Co, Ni, Cu, Zn, Ga, Ge, As, Se, Rb, Sr, Zr, Nb, Mo, Ru, Rh, Pd, Ag, Cd, In, Sn, Sb, Cs, Ba, Sc, Y, La, Ce, Pr, Nd, Sm, Eu, Th, Dy, Ho, Er, Tm, Yb, Lu in a lesser concentration, and heavy ions of Hf, Ta, W, Re, Os, Ir, Au, Hg, Tl, Pb, Bi, U, Th in a greater concentration than in the peripheral zone of the volume-causes wave guide properties of this element.

The specific case of the offered invention is the growing of the described above crystals in inert, restoring or weakly oxidising environments. Under these conditions the vacancies in oxygen sub—lattice are formed in crystals and the composition of crystal is described by the formula: $Lu_1 A_{1-x}$, $Ce_x SiO_{5-z}$, where A—Lu and at least one of the elements of the group Gd, Sc, Y, La, Pr, Nd, Sm, Eu, Th, Dy, Ho, Er, Tm, Yb, x—the concentration of cerium ions, z—concentration of oxygen vacancies. With the small concentration of vacancies in the oxygen sub—lattice, vacancies weakly influence upon the times of luminescence of ions $Ce^{3+}$ and the light output of scintillating materials, however the increase of concentration brings about the sharp decrease of the light output. In this connection the proposed scintillating material with oxygen vacancies has to be considered as an individual case of the present invention. The presence in the source reagents or the addition in necessary quantity into the scintillating material of ions, having the degree of oxidation of +4, +5, +6 (for example, Zr, Sn, Hf, As, V, Nb, Sb, Ta, Mo, W, Th) interferes with the formation of vacancies in an oxygen sub—lattice.

Raising the efficiency of introducing radiation from scintillating crystal into the glass waveguide fibre, is an independent technical task. This technical result is achieved by way of using waveguide scintillating element, i.e. creating waveguide properties in the scintillating element itself at the expense of the refractive index gradient along its cross section. The refractive index gradient appears in crystal because of the difference of the chemical composition of its central part from the chemical composition of its lateral part, similar to glass optical waveguides, used for the optical transmission of information ["Reference book on laser technology". Translation from German by V. N. Belousov, Moscow, "Energoizdat", 1991, page 395// WISSENSSPRE-ICHER LASERTXCHNIK/ Witolf Brunner, Klaus Junge./ VEB Fachbucherverlag Leipzig, 1987]. The refractive index of the central part of the scintillating waveguide element should be grater than that of the peripheral part. In this case a scintillation element acquires an additional property: it focuses radiation along the axis of an element, as a result of which the radiation goes out of the scintillating element with a smaller divergence than from usual scintillating elements. This allows to decrease the divergence and, as a consequence, decrease the losses of radiation during its introduction into a glass fibre. Decease of the refractive index of the peripheral part of the scintillating element due to the change of the crystal composition can be achieved by any of the known methods or their combination:

growing of a profiled crystal, which allows to immediately receive crystals, the composition of the peripheral part of which is different from their central part.

diffusion of light atoms from the melt, diffusion from hard phase or gas phase into the surface layer of the scintillation element.

Additionally, for strengthening the waveguide effect, after growth and/or non polished surfaces of scintillating elements can be polished chemically. Bt that all lateral surfaces can be polished simultaneously at scintillating elements in the amount 2–100 pieces (or more), for example, with the size 2×2×15 mm or 3×3×15 mm. For etching it is possible to use any polishing mixtures of acids, based on $H_3PO_4$ with the addition of any acids, for example, $HNO_3$, $H_2SO_4$, HCl, HF. For improvement of polishing properties any organic or inorganic salts containing ions H, Li, Be, B, C, N, F, Na, Mg, Al, Si, P, S, Cl, K, Ca, Ti, V, Cr, Mn, Fe, Co, Ni, Cu, Zn, Ga, Ge, As, Se, Br, Rb, Sr, Zr, Nb, Mo, Ru, Rh, Pd, Ag, Cd, In, Sn, Sb, Te, I, Cs, Ba, Sc, Y, La, Ce, Pr, Nd, Sm, Eu, Gd, Th, Dy, Ho, Er, Tm, Yb, Lu, Hf, Ta, W, Re, Os, Ir, Pt, Au, Hg, Ti, Pb, Bi, U can be added to the mixture of acids. Comparison of scintillating elements with mechanically polished surfaces and chemically polished elements has shown that chemical polishing provides for the increase of the refractive capacity of the surface of any scintillating element, including a waveguide element.

Both the growing of profiled scintillating crystals, and the additional chemical polishing of scintillating element surfaces, allows to achieve a positive technical result—the exclusion of expensive mechanical polishing of lateral surfaces of scintillating crystals, including that at the stage of their growth. It is necessary to point out that growing of profiled scintillating crystals allows to avoid an expensive polishing of lateral surfaces due to the introduction into the material of the above admixtures. These admixtures, at certain concentrations, allow to suppress the evaporation of easily volatile components from the surface of the growing crystal. As a result the surface of blanks for scintillation elements is smooth, does not require further mechanical polishing. In separate cases an additional chemical polishing of the lateral surfaces of scintillating elements is required.

Waveguide scintillating elements with the refractive index gradient along its cross section allow for almost two times increase the effectiveness of the introduction of radiation into a glass waveguide fibre (with the length of 4–5 meters), which transmits radiation from a scintillation crystal to the photo electronic multiplier. The presence of a glass waveguide fibre is principle and obligatory design element in a new type of medical three dimensional tomographs, in which simultaneously used are two different physical methods of obtaining image of a man's brain: electron—positron tomography for metabolic process in the brain and magnetic resonance tomography for the creation of the map of the anatomic composition of the brain. Magnetic resonance tomography requires the placement of metal containing components of photo electronic multipliers at certain distance, and because of that the use of a glass waveguide fibre is the only possibility to combine electron-positron tomography with magnetic resonance tomography in one device. That is why the use of a waveguide scintillating element which can be manufactured from any scintillating material (Ce: $Gd_2SiO_5$, Ce:$Lu_3Al_5O_{12}$, Ce:$YAlO_3$, $Bi_4Ge_3O_{12}$ and others), can be considered as an application for new purpose of the material, having a waveguide properties, at the expense of the refractive index gradient along its cross section.

1. Scintillating material based on known crystals of oxyorthosilicates, including cerium Ce and crystallized in a structural type of $LU_2SiO_5$ with a spatial group B2/b, Z=8, the composition of which is represented by the chemical formula $$Lu_1A_{1-x}Ce_xSiO_5$$

where A—Lu and at least one of the elements of the group Gd, Sc, Y, La, Pr, Nd, Sm, Eu, Th, Dy, Ho, Er, Tm, Yb, x—from $1\times10^{-4}$ f. units up to 0.2 f. units wherein it contains at least one element of the group Zr, Sn, Hf, As, V, Nb, Sb, Ta, Mo, W in the range from $1\times10^{17}$ atom/cm$^3$ up to $5\times10^{20}$ atom/cm$^3$.

The lower limit of these elements is determined by the fact that at concentrations lower than the above limit of the technical result, the increase of the light output of luminescence, decrease of the time of luminescence for ions $Ce^{3+}$, increase of the reproducibility of the properties of grown single crystals, decrease of the cost of source melting stock for growing crystals of scintillators, containing in great amount of $LU_2O_3$—are not observed. With the concentrations of the above elements lower that the above limit, the implementation of the technical task in individual forms of execution is also not achieved, namely it is not possible to prevent the cracking of crystals during cutting and manufacturing of scintillating elements, if as a source reagent used is $LU_2O_3$ with the purity of 99,9% (or less).

The upper limit of these elements is determined by their maximum possible content in crystals, which are crystallized in a structural type $LU_2SiO_5$ with a spatial group b2/b (Z=8). When their content is above the indicated limit, the destruction of the structural type $LU_2SiO_5$ takes place and the formation of inclusions of other phases, which determine the scattering of light and the decrease of transparency of a scintillating crystal.

2. Scintillating material based on known crystals of oxyorthosilicate, including cerium Ce, the composition of which is represented by the chemical formula $$A_{2-x}Ce_xSiO_5$$

where A—is at least one of the elements of the group Lu, Gd, Sc, Y, La, Pr, Nd, Sm, Eu, Th, Dy, Ho, Er, Tm, Yb, x—from $1\times10^{-4}$ f. units up to 0.2 f. units wherein it contains fluorine F in the range from $1\times10^{-4}$ f. units up to 0.2 f. units and/or at least one of the elements of group H, Li, Be, B, C, N, Na, Mg, Al, P, S, Cl, K, Ca, Ti, V, Cr, Mn, Fe, Co, Ni, Cu, Zn, Ga, Ge, As, Se, Rb, Sr, Zr, Nb, Mo, Ru, Rh, Pd, Ag, Cd, In, Sn, Sb, Cs, Ba, Hf, Ta, W, Re, Os, Ir, Pt, Au, Hg, Tl, Pb, Bi, U, Th in the range from $1\times10^{17}$ atom/cm$^3$ up to $5\times10^{20}$ atom/cm$^3$.

The lower limit of these elements is determined by the fact that at concentrations lower than the indicated limit of a technical result, lying in creating waveguide properties in scintillating elements at the expense of a refractive index gradient along the cross section, cannot be reached.

The upper limit for these elements is determined by their maximum possible content in crystals with the structure of orthosilicate. When their content is higher than the above limit the destruction of oxyorthosilicate structure takes place.

3. An individual case of the proposed inventions is a scintillating material, wherein it additionally contains oxygen vacancies in the amount of not more than 0.2 f. units. This scintillating material, crystallized at the structural type $LU_2SiO_5$ with a spatial group B2/b, Z=8, the composition of which is represented by the chemical formula $$Lu_1A_{1-x}Ce_xSiO_{5-z}$$

where A—Lu and at least one of the elements of the group Gd, Sc, Y, La, Pr, Nd, Sm, Eu, Th, Dy, Ho, Er, Tm, Yb, x—from $1\times10^{-4}$ f. units to 0.2 f. units.

z—from $1\times10^{-5}$ f. units to 0.2 f. units.

While growing the above new scintillating materials in an inert, restoring or weakly oxidising environments, oxygen vacancies are formed in crystals, which in small concentrations weakly affect the achievement of the positive result of the invention. It is practically impossible to establish the lower limit for the content of oxygen vacancies in a scintillating material because of the lack of valid methodologies for determining low concentrations of vacancies for oxygen, that is why the lower limit is equal to $1\times10^{-5}$ f units, which corresponds to the minimal concentration of heterovalent admixtures $Me^{2+}$, the presence of which in a crystal of a scintillator causes the appearance of vacancies in an oxygen sub—lattice.

The upper limit of the content of oxygen vacancies is determined by the fact that scintillating materials with the content of oxygen vacancies in the material in the unity greater than 0.2 f. units is not applicable for utilization for its direct purpose—for the registration of x-ray, gamma and alpha radiation.

4. The other individual case of the proposed inventions is a scintillating material wherein it contains ions $Ce^{3+}$ in the range from $5\times10^{-5}$ f. units up to 0.1 f. units.

The lower limit for the ions of cerium is determined by the fact that with the content of $Ce^{3+}$ in the quantity of less than $5\times10^{-5}$ f. units, the effectiveness of a scintillation luminescence of $Ce^{3+}$ becomes insignificant because of the small concentration. It is necessary to point out that the limit of concentration interval for the content of cerium in a crystal is decreased two times. This is related to the fact that due to the use of the proposed scintillating matter a possibility of receiving scintillating materials-oxyorthosilicates with a maximum possible contents of ions of $Ce^{+3}$ appears only in a coordination polyhedron $LuO_7$.

The upper limit of the content of $Ce^{3+}$ in a crystal is determined based on the fact that with the content of $Ce^{3+}$ greater than 0.1 f. units, it is impossible to optically receive a high quality crystal. This is related to the high content of additional elements in a crystal, necessary for obtaining a maximum possible content of ions of cerium +3 in coordination polyhedrons $LuO_7$.

5. The other individual case of the proposed inventions is a scintillating material, wherein its surfaces are additionally polished by way of a chemical etching.

Additional chemical polishing allows to increase the effects, reached during the solution of technical tasks in the process of manufacturing scintillating elements from the proposed new materials.

6. For the solution of the technical task of raising the effectiveness of the introduction of irradiation into the glass waveguide fibre, it is offered got the first time to use the known waveguide effect, created at the expense of the gradient of concentrations, directly in a scintillating element. Thus, a waveguide scintillating element allows to use the known waveguide effect for a new purpose, namely for the increase of the light output of irradiation, appearing in a scintillating element during the registration of x-ray, gamma and alpha radiation-by focusing the radiation of luminescence along the axis of a scintillating element. The features of invention relating to a waveguide scintillating element bear a general character, i.e. they are related to any scintillating material (glass, oxide and fluorine crystals, composite materials and other materials) for: registration and measurement of x-ray, gamma and alpha radiation, protons, neutrons and other heavy particles.

DETAILED DESCRIPTION OF THE INVENTION

Figure 1:
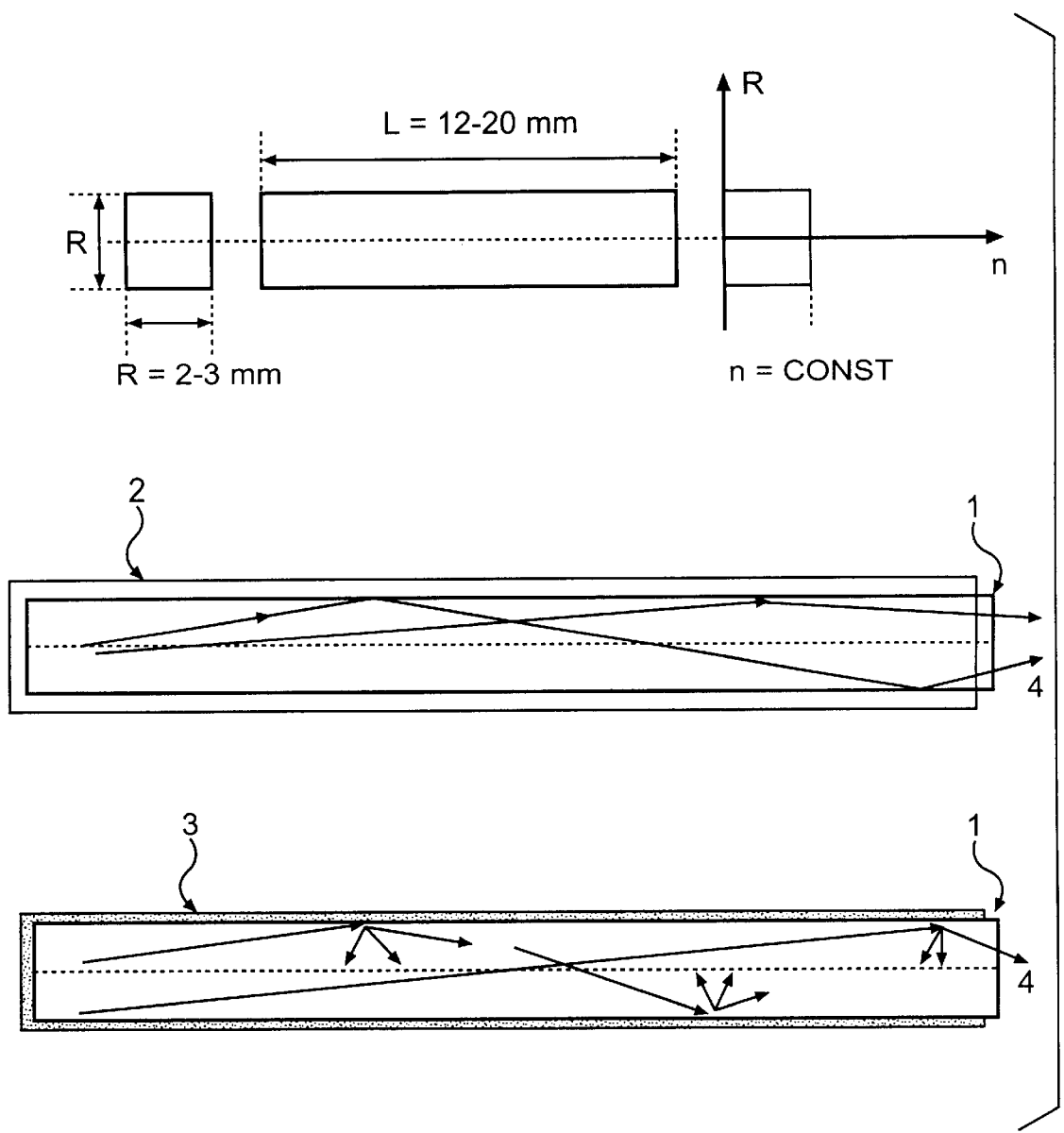
FIG. 1 shows the scheme of the reflection and expansion of the luminescent radiation in a scintillating element (L>>R) with a constant refractive index in known scintillation detectors (R×R—cross section of the element, L—its length, n—refractive index). The scintillating element 1 has all six lateral facets, polished mechanically. For the increase of the effectiveness of reflection it is possible to use metallic mirror coating 2, for example, from aluminum. or diffused reflective coatings 3, for example, of MgO, $Al_2O_3$, Bn, teflon or other white materials. Luminescent radiation 4, going out of the end plane of the element is directed to the photoelectron multiplier or is focused in a glass light guide for transferring to the measurement device, located at some meters from the scintillating element.

Table 1 shows a comparison of the light output and effective atomic number of crystals of the prototype depending on the composition of a scintillating material. Table 2 shows the constant of the scintillations decay time ($\tau$, ns) and the light output (%) and provides examples of specific compositions of crystals and the prototype, grown by Czochralski method,

TABLE 1

Comparison of the light output and the effective atomic number of prototype crystals depending on the composition of a scintillating material

| Crystal | Crystal composition | Light output | Effective atomic number |
|---|---|---|---|
| Ce:LSO | C. L. Melcher, Schlumberger-Doll Research | 0.94 | 63.7 |
| Ce:LSO | $Lu_{1.974}Ce_{0.0046}SiO_5$ | 1.00 | 63.71 |
| 0.8LSO/0.2GSO | $Lu_{1.672}Gd_{0.298}Ce_{0.0036}SiO_5$ | 0.77 | 62.82 |
| 0.5LSO/0.5GSO | $Lu_{1.136}Gd_{0.847}Ce_{0.0072}SiO_5$ | 0.43 | 61.12 |
| 0.1LSO/0.9GSO | $Lu_{0.173}Gd_{1.830}Ce_{0.0127}SiO_5$ | 0.29 | 57.66 |
| Ce:GSO | Commercial sample of Hitachi Chemical Co. | 0.41 | 56.94 |

TABLE 2

Constant of scintillations decay time ($\tau$, ns) and light output (%)

| The composition of the melting stock and purity of source reagents | Size of the sample | Constant of the decay time $\tau$, ns | Light output, % |
|---|---|---|---|
| $Lu_{1.98}Ce_{0.02}SiO_5$ *) $Lu_2O_3$, $CeO_2$, $SiO_2$ purity 99.995% | 10 × 10 × 2 mm ***) | 42.3 | 100 |
| $Lu_{1.98}Ce_{0.003}SiO_5$ *) $Lu_2O_3$, $CeO_2$, $SiO_2$ purity 99.995% | 10 × 10 × 2 mm ***) | 44.1 | 98 |
| $Lu_{0.99}Gd_{0.99}Ce_{0.002}SiO_5$ **) $Lu_2O_3$, $CeO_2$, $SiO_2$, $Gd_2O_3$ purity 99.995% | 5 × 5 × 5 mm ****) | 33.9 | 43 |
| $Lu_{1.98}Ce_{0.003}SiO_5$ *) $Lu_2O_3$, purity 99.8% $CeO_2$, $SiO_2$, purity 99.995% | 10 × 10 × 2 mm ***) | 43.8 | 31 |
| $Lu_{1.975}Ce_{0.02}Ta_{0.005}SiO_{5.002}$ $Lu_2O_3$ purity 99.8% $CeO_2$, $SiO_2Ta_2O_5$, purity 99.995% | 10 × 10 × 2 mm ***) | 38.3 | 100 |
| $Lu_{1.977}Ce_{0.02}W_{0.003}SiO_{5.002}$ $Lu_2O_3$ with the purity 99.8% $CeO_2$, $SiO_2$, $WO_3$, purity 99.995% | 10 × 10 × 2 mm ***) | 39.2 | 100 |
| $Lu_{1.974}Ce_{0.02}Ca_{0.001}Ta_{0.05}SiO_4F_{0.06}$ $Lu_2O_3$ with the purity 99.8% $CeO_2$, $SiO_2$, $Ta_2O_5$, purity 99.995% CaO, $CeF_3$, purity 99% | 10 × 10 × 2 mm ***) | 32.1 | 102 |
| $Lu_{1.975}Ce_{0.00025}Ta_{0.005}SiO_{5.002}$ $Lu_2O_3$, $CeO_2$, $SiO_2Ta_2O_5$ with the purity of 99.995% | 10 × 10 × 2 mm ***) | 38.0 | 6 |

Notes:
*) the known scintillating crystal is indicated
**) prototype crystal is indicated
***) two surfaces 10 × 10 mm are mechanically polished
****) all surfaces 5 × 5 mm are mechanically polished

EXAMPLE 1

Growing of crystals with a structural type $LU_2SiO_5$ and a spatial group B2/b (Z=8), additionally containing at least one element of the group Ti, Zr, Sn, Hf. As, V, Nb, Sb, Ta, Mo, W.

Growing of these crystals was conducted according to the general scheme—by way of extruding from melt by any method, in particular by Czochralski method (described in detail below in example 2).

A scintillating crystal, grown of a melting stock $Lu_{1.977}Ce_{0.02}W_{0.003}SiO_{5.002}$ on the basis of $LU_2O_3$ (purity 99.8%), additionally containing the ions of tungsten in the range of $1.2 \times 10^{19}$ atom/cm$^3$, has a position of a maximum of luminescence about 418 nm and the time of luminescence (decay of scintillations) $\tau$=39 ns, compared with $\tau$=42 ns for crystal, grown from the melt with the composition of $Lu_{1.98}Ce_{0.02}SiO_5$ (table 2).

These data confirm the possibility of growing crystals, containing ions of $Ce^{3+}$ advantageously in coordination polyhedrons $LuO_7$, if the melt is additionally doped with ions of the following elements: Ti, Zr, Sn, Hf; As, V, Nb, Sb, Ta, Mo, W, which occupy in a crystal an octahedral polyhedron $LUO_6$ or tetrahedral positions. All these admixtures ions have an increased concentration in the diffused layer at the crystallisation front, as their coefficients of distribution are small (K<0.2). An increased concentration of admixtures with the charge 4+, 5+, 6+ in a diffused layer interferes with the incorporation into the crystal of cerium atoms in the form of $Ce^{4+}$, and does not affect the competing process of the substitution of $Ce^{3+} \Rightarrow Lu_1$, when it becomes the main one.

EXAMPLE 2

Obtaining a scintillation material on the basis of oxyortho silicate crystal, including cerium Ce, the composition of which is expressed by the chemical formula $A_{2-x}Ce_xSiO_5$, wherein A is at least one element of the group Lu, Gd, Sc, Y, La, Pr, Nd, Sm, Eu, Th, Dy, Ho, Er, Tm, Yb, as well it contains fluorine F and/or at lest one of the elements of the group H, Li, Be, B, C, N, Na, Mg, Al, P, S, Cl, K, Ca, Ti, V, Cr, Mn, Fe, Co, Ni, Cu, Zn, Ga, Ge, As, Se, Rb, Sr, Zr, Nb, Mo, Ru, Rh, Pd, Ag, Cd, In, Sn, Sb, Cs, Ba, Hf; Ta, W, Re, Os, fr, Pt, Au, Hg, Tl, Pb, Bi, U, Th.

The data of table 2 demonstrate the possibility of using reagent $Lu_2O_3$ with the purity of 99.8% instead of a more expensive $Lu_2O_3$ with the purity of 99.995%. The introduction of additional compensating ions while using reagent $Lu_2O_3$ with the purity of 99.8% eliminates the possibility of deterioration of the most important parameter—the constant of time of scintillations decay $\tau$, for example, for crystals grown of the melting stock of the composition $Lu_{1.974}Ce_{0.002}Ca_{0.001}Ta_{0.05}SiO_{4.94}F_{0.06}$ and $Lu_{1.975}Ce_{0.02}Ta_{0.05}SiO_{5.002}$.

For growing the crystal of lutetium—cerium—tantalum orthosilicate by the method of Czochralski the melting stock of the composition of $Lu_{1.975}Ce_{0.02}Ta_{0.05}SiO_{5.002}$ was used, which contained micro admixtures of Na, Mg, Al, Si, Ca, Ti, Cr, Mn, Co, Ni, Cu, Zn, Mo, Ba, Sc, Y, La, Ce, Pr, Nd, Sm, Eu, Gd, Th, Dy, Ho, Er, Tm, Yb, W, Pb, Th—which were present in the source reagent $Lu_2O_3$ (99.8%) in the range from $1 \times 10^{17}$ atom/cm$^3$ up to $1 \times 10^{19}$ atom/cm$^3$. By that, the following method of receiving samples was used: source reagents lutetium oxide and silicon oxide were thoroughly mixed, pressed in tablets and synthesised in a platinum crucible during 10 hours at 1200° C. Then by means of induction heating the tablets were melted in an iridium crucible in a sealed chamber in the atmosphere of nitrogen (100 volumetric % of $N_2$). Before growing, a cerium and tantalum oxide were added into the melt. A crystal was grown out of iridium crucible with the diameter of 80 mm with the volume of the melt of 330 cm$^3$. At a speed of crystal pulling of 3 mm/hour and the frequency of crystal rotation of 20 rounds per minute. After detachment of the grown crystal from the melt, the crystal was gradually cooled down to a room temperature during 40 hours.

Experimental research of the relationship of the constant of the time of decay of scintillations ($\tau$, ns) and the light output in the area of 400–430 nm, depending on the chemical composition of crystals, was carried oufusing the radiation of radio nuclide $^{60}Co$, similar to the methodology of E. G. Devitsin, V. A. Kozlov, S. Yu. Potashov, P. A. Studenikin, A. I. Zagumennyi, Yu. D. Zavartsev "Luminescent properties of $Lu_3Al_5O_{12}$ crystal, doped with Ce". Proceedings of the International Conference "Inorganic scintillators and their applications" (SCINT' 95), Delft, the Netherlands, Aug. 20–Sept. 1, 1995. The results of measurements are shown in table 2.

EXAMPLE 3

Scintillating material based on the crystal of orthosilicate additional containing oxygen vacancies. For creating oxygen vacancies in crystalline samples, obtained by the method of Czochralski, their heating in vacuum during 2 hours at the temperature in the interval of 1200° C.–1620° was used.

The formation of oxygen vacancies insignificantly affects the scintillation parameters of crystals, grown from reagents with the purity of 99.995%. On the contrary, oxygen vacancies bring about the decrease by 20% –70% of the light output of crystals, additionally doped, for example, by ions of Mo, W, Ta, due to the formation of dying centres.

The presence of oxygen vacancies completely suppresses the luminescence of admixture rare earth ions Pr, Sm, Tb, Ho, Er, Tm, and does not affect the luminescence properties of ions of $Ce^{3+}$. In crystals of oxyorthosilicate additionally containing oxygen vacancies completely suppressed and absent is the luminescence of ions of $Tm^{3+}$ at 452 ran, ions $Pr^{3+}$ at 470–480 nm and 520–530 nm, ions $Tb^{3+}$ at 544 nm, ions $Ho^{3+}$ at 550 nm, ions $Er^{3+}$ at 560 nm, ions 593 um. The time of luminescence (decay of scintillations) of ions Pr, Sm, Tb, Ho, Er, Tm, is for several orders of magnitude longer than for ion of $Ce^{3+}$, that is why the suppression of luminescence of admixture rare earth ions in the visible and infrared area of the spectrum is necessary for the preservation of quick operation of elements based on $Ce^{3+}$ ion, which is experimentally observed in silicates crystals, additionally containing oxygen vacancies.

EXAMPLE 4

Scintillating material on the basis of oxyorthosilicate crystal, which contains $Ce^{3+}$ ions in the quantity of $5 \times 10^{-5}$ f., units up to 0.1 f. units. For growing by Czochralski method of lutetium—cerium—tantalum orthosilicate crystal, containing $Ce^{3+}$ ions in the range of $5 \times 10^{-5}$ f. units, the melting stock was used with the chemical composition of $Lu_{1.975}Ce_{0.0025}Ta_{0.005}SiO_{5.002}$ on the basis of source reagents ($Lu_2O_3$, $CeO_2$, $SiO_2$, $Ta_2O_5$) with the purity of 99.995%. The crystal was grown out of the iridium crucible with the diameter of 60 mm at a speed of pulling of 3 mm/hour and frequency of rotation of 20 rounds per minute.

At a contents of $Ce^{3+}$ in a crystal in the amount of less than $5 \times 10^{-5}$ f. units, the effectiveness of the scintillation luminescence of $Ce^{3+}$ becomes insignificant due to a small concentration, as a result of which the light output (table 2) does not exceed 6% for samples, made of the top and bottom part of the crystalline boule with the weight of 1040 g.

The important technical advantage of scintillation crystals of oxyorthosilicates, containing small quantities of $Ce^{3+}$ ions ($5 \times 10^{-4}$–$5 \times 10^{-5}$ f. units), is the possibility to use 100% of the me the process of crystal growth, which considerably increases the time of operation of iridium, crucibles, and, consequently, decreases the cost of scintillating elements.

EXAMPLE 5

Chemical polishing of the lateral surface of a scintillating element.

Stepanov's method or any other similar method allows to grow scintillation crystals with a necessary cross section (2×2 min or 3×3 mm), which allows to eliminated the operation of cutting a large boule, and chemical polishing permits to polish all lateral surfaces simultaneously at scintillating elements in the quantity of 2–100 pieces (or more), for example, with the size of 2×2×15 mm or 3×3×15 mm. By that the lateral surface can have any form: cylindrical, conical, rectangular, polygonal or random. Cheap chemical polishing allows to exclude and expensive mechanical polishing of the lateral surface of scintillating elements in the process of their manufacturing.

The crystal $Lu_{1.997}Ce_{0.002}Ta_{0.001}SiO_{5.0004}$ was grown by the method of Czochralski according to the methodology, described in example 2. 40 scintillating elements were cut out of a crystalline boule (10 elements of the size 2×2×15 mm, 10 elements of the size 2×2×12 mm, 10 elements of the size 3×3×15 min, 10 elements of the size 3×3×20 mm). All 40 elements were simultaneously subjected to chemical polishing at temperature of 260° C. in the mixture of the following composition: $H_3PO_4$ (30%)+$H_2SO_4$(61%)+NaF (4%0+NaCl (5%). The concentration is indicated in weight percent. Optimal time of chemical etching is 30 minutes. As a result of chemical polishing an optically smooth lateral surface was obtained at which there are no pyramids of growth and etching pits.

Figure 3:
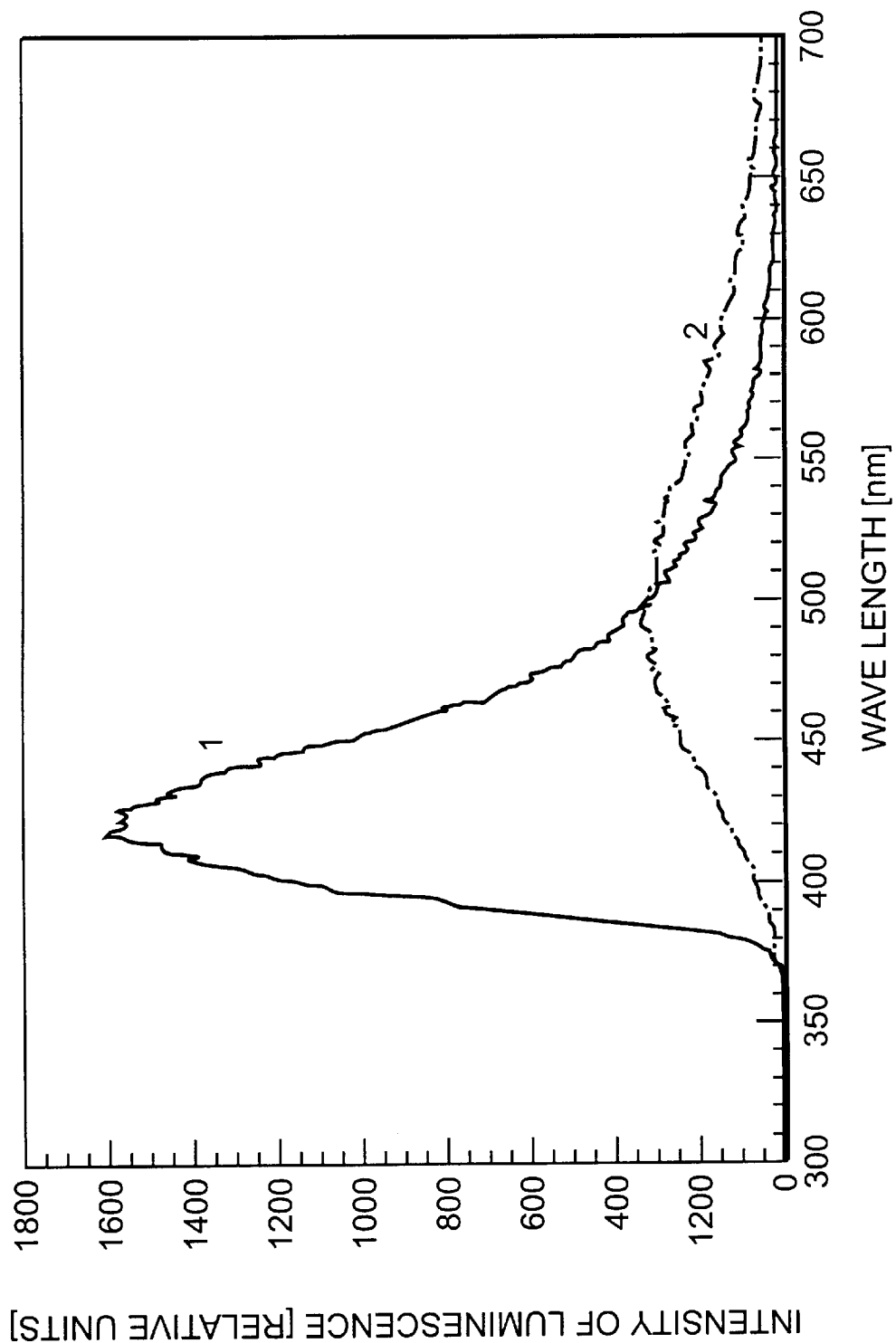
FIG. 3 shows a light output of scintillating element 1 out of a crystal $Lu_{1.997}Ce_{0.002}Ta_{0.001}SiO_{5.0004}$ after a chemical polishing, which is more than 5 times higher that with 2—standard $Bi_4Ge_3O_{12}$ with a mechanically polished lateral surfaces. Measurements are made on the samples of identical size and in the same conditions.

The light output of a scintillating element $Lu_{1.997}Ce_{0.002}Ta_{0.001}SiO_{5.0004}$ after chemical polishing is more than 5 times higher than with the standard one used in electron—positron tomography $Bi_4Ge_3O_{12}$ with mechanically polished lateral surfaces (FIG. 3).

EXAMPLE 6

The creation of waveguide properties in scintillating elements at the expense of the refractive index gradient along its cross section.

In the process of growth of a profiled crystal from melt, its cross section is determined by the form of a melt column. Different physical effects are used for the shaping of the melt. The creation of the melt column of a certain form with a help of a shaper is known as Stepanov's method for growing profiled crystals [Antonov P. I., Zatulovskiy L. M., Kostygov A. S. and others "Obtaining profiled single crystals and articles by Stepanov's method", L., "Nauka", 1981, page 280].

Figure 2:
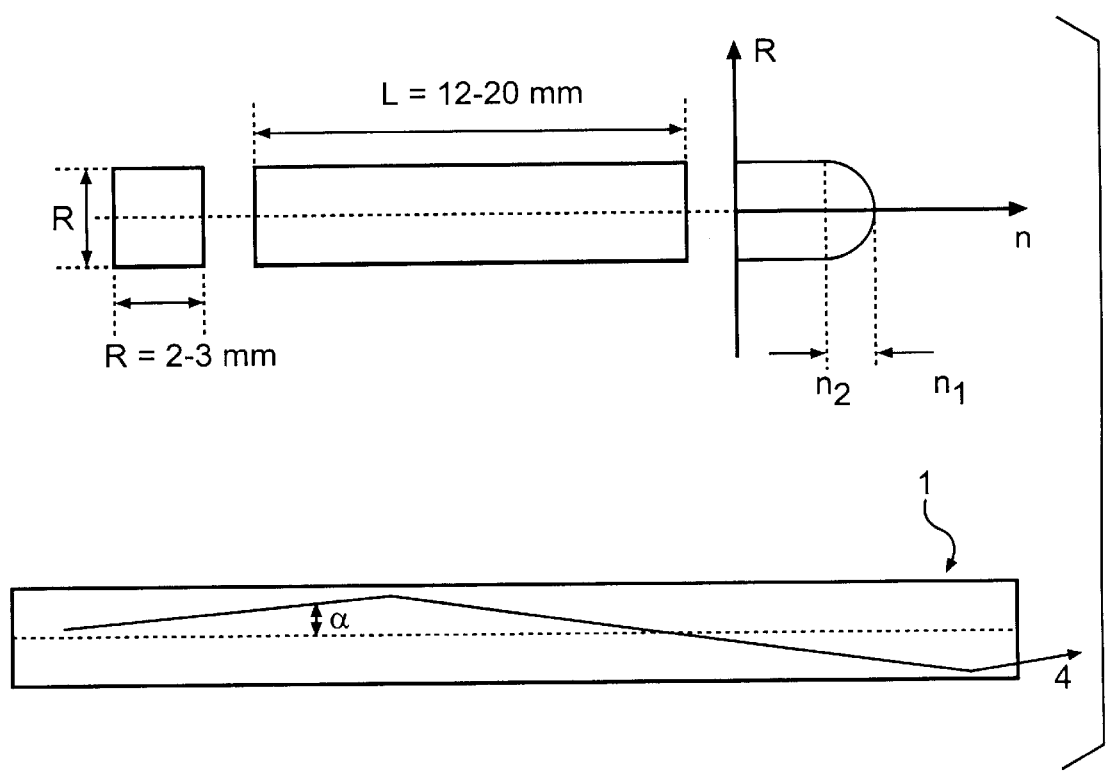
FIG. 2 shows the scheme of reflection and the expansion of a luminescent radiation in a scintillating element (L>>R) with the refractice index gradient along the cross section (R×R—cross section of the element, L—its length, $n_1$—the refractive index in the centre of the element, $n_2$—the refractive index at the periphery of the element, $\alpha$—an angle of the expansion of the luminescent beam). The scintillating element 1 has only one polished facet—through which the radiation is leaving for registration. Luminescent radiation 4, going out of the end plane of the element is directed to the photoelectron multiplier or is focused into a glass light guide for transferring to the measurement device, located at some meters from a scintillating element.

The application of Stepanov's method opens the possibility of growing scintillating crystals of the size of 3×3×200 mm with the formation of a waveguide nucleus in the crystal in the process of growth. The waveguide nucleus appears if there are admixtures in the melt, which depending on the coefficient of distribution are concentrated in the central part (K>1) or in the peripheral part (K<1) of the growing crystal. FIG. 2 shows non uniform distribution of admixture along the crystal cross section ($n_1$, refractive index in the centre of a crystal and $n_2$—refractive index at the periphery of the crystal). Non uniform distribution of admixture ions along the cross section (3×3 mm) of the crystal brings about the refractive index gradient along its cross section, while if $n_1 > n_2$, a waveguide effect takes place. The waveguide effect brings about focusing of a light flow along the axis of an element and increases the amount of light, leaving the end plane of the scintillating element, which in the long run determines the effectiveness of an actual gamma ray detector. The increase of the light flow from the end plane of the scintillating element occurs due to the decrease of the summary losses of scintillating radiation during reflection from a lateral surface.

The second important advantage of scintillating elements (size 3×3×15 mm after cutting of a crystal rod into several elements) with a waveguide effect compared to the elements 3×3×15 mm, manufactured from a large crystalline boule, is 1.5–1.6 times greater effectiveness of the input of light beams into a glass light guide, which is responsible for the transfer of scintillating radiation from a scintillating element to the photoelectronic multiplier in a new type of medical 3-dimensional tomographs, in which simultaneously two different physical methods of obtaining brain image of a man are used: electron-positron tomography and magnetic resonant tomography.

The growing of a profiled crystal by Stepanov's method was conducted using an iridium crucible with an iridium former, having a cross section of the outer edge of 3×3 mm, which was assigning the cross section of the growing crystal. Transportation of melt out of crucible took place along a central capillary with the diameter of 0.9 mm due to capillary effect. For example, for obtaining a lutetium—gadolinium—cerium orthosilicate crystal with a focusing waveguide effect a melting stock with the composition $Lu_{1.672}Gd_{0.298}Ce_{0.0036}SiO_5$ was used, using the following methodology. Source reagents: lutetium oxide, gadolinium oxide and silicon oxide were thoroughly mixed, pressed in tablets and synthesised in a platinum crucible during 10 hours at 1200° C. Then, by means of induction heating the tablets were melted in an iridium crucible in a sealed chamber in the atmosphere of nitrogen (100 volumetric % $N_2$). Cerium oxide was added to the melt before growing. The former allowed to grow from one to four profiled crystals simultaneously. Etching was performed to the crystal $Lu_2SiO_5$, cut in a crystallographic direction (001), i.e. along the axis of optical indicatrix, having the greatest refractive index $n_g$. Profiled crystals were pulled out of melt at a speed of 4–15 mm/hour without rotation. growing a profiled crystal at a speed of higher than 20 nun/hour brings about the growth of crystal of a permanent composition along the rod cross section. Upon the crystals reaching the length of 50–90 mm they were torn from the shaper by a sharp increase of the speed of pulling. The grown profiled crystals were cooled to a room temperature during 12 hours.

Profiled crystalline rods were cut into several scintillating elements of the size of 3×3×15. One sample with mechanically polished 6 surfaces was used for the determination of composition with a help of electronic micro analysis (Cameca Camebax SX-50, operating at 20 kV, 50 μA and diameter of the beam of 10 microns). For a profiled crystal, grown at a speed of pulling of 4 mm/hour, a crystalline rod in the centre had a composition $Lu_{1.78}Gd_{0.202}Ce_{0.0015}SiO_5$ and lateral surfaces had a composition in the range $LU_{1.57-1.60}Gd_{0.30-0.0045}SiO_5$. Gradient of the refractive index along a crystal cross section was determined from the interference picture: $n_1 - n_2 = 0.006$, where $n_1$ is a refractive index at the centre of a crystal and $n_2$ is a refractive index at the periphery of a crystal. The presence of a refractive index gradient causes focusing along the axis of a waveguide scintillation element of all beams of scintillating radiation thanks to a complete internal reflection, if an angle between an optical axis and the direction of scintillation radiation is less than the angle $\alpha_{max.}$, calculated according to the formula ["Reference boor on laser technique". Translation from German B. N. Belousov, Moscow, Energoizdat", 1991, page 395// WISSENSSPREICHER LASERTECHNIK/Witolf Brunner, Klaus Junge./ VEB Fachbucherverlag Leipzig, 1987]:

$$\sin\alpha_{max.} = \sqrt{n^2K - n^2m} \tag{8}$$

where $n_m$ the refractive index of the coating (periphery) of a light guide and $n_k$ is a refractive index of the core of the optical waveguide.

For a scintillating element with the value of a refractive index gradient along the crystal cross section equal to $n_1-n_2=0.006$ a complete internal reflection of all scintillating beams will take place if the angle of their spread is less than angle $\alpha_{max.}=8.4$ degrees. It is necessary to point out that a complete internal reflection of scintillation beams, having the direction of $\alpha<\alpha_{max.}$, takes place irrespective of the fact if the lateral surface of a scintillating element is polished or not. For scintillating elements widely used in computer tomography with a cross section of 2×2 mm or 3×3 mm and length of 15–20 mm with the angle of complete internal reflection $\alpha_{max.}=8.4$ degrees there will take place 2–3 complete internal reflections of scintillating beams before their leaving, the element (FIG. 2).

What is claimed is:

1. Scintillating material based on a silicate crystal comprising a lutetium (Lu) and cerium (Ce) characterised in that the composition of the crystal is represented by the chemical formula $$Lu_{1-y}Me_yA_{1-x}Ce_xSiO_5$$

where

A is Lu and at least one element selected from the group consisting of Gd, Sc, Y, La, Pr, Nd, Sm, Eu, Tb, Dy, Ho, Er, Tm, Yb, Me is at least one element selected from the group consisting of Ti, Zr, Sn, Hf, As, V, Nb, Sb, Ta, Mo, W, x is a value between $1\times10^{-4}$ f.u. and 0.2 f.u.

y is a value between $\times10^{-5}$ f.u. and 0.05 f. u.

2. Scintillating material based on a silicate crystal comprising lutetium (Lu) and cerium (Ce) characterised in that it contains oxygen vacancies ¤ at the quantity not exceeding 0.2 f.u. and its chemical composition is represented by the formula $$Lu_{1-y}Me_yA_{1-x}Ce_xSiO_{5-z}\alpha_z$$

where

A is Lu and at least one element selected from the group consisting of Gd, Sc, Y, La, Pr, Nd, Sm, Eu, Tb, LDy, Ho, Er, Tm, Yb, Me is at least one element selected from the group consisting of H, Li, Be, B, C, N, Na, Mg, Al, P, S, Cl, K, Ca, Ti, V, Cr, Mn, Fe, Co, Ni, Cu, Zn, Ga, Ge, As, Se, Rb, Sr, Zr, Nb, Mo, Ru, Rh, Pd, Ag, Cd, In, Sn, Sb, Cs, Ba, Hf, Ta, W, Re, Os, Ir, Pt, Au, Hg, Tl, Pb, Bi, U, Th, x is a value between $1\times10^{-4}$ f.u. and 0.2 f.u., y is a value between $1\times10^{-5}$ f.u. and 0.05 f.u., z is a value between $1\times10^{-5}$ f.u. and 0.2 f.u.

3. Scintillating material based on a silicate crystal comprising cerium (Ce), characterised in that it contains fluorine (F) and its composition is represented by the chemical formula $$A_{2-x-y}Me_yCe_xSiO_{5-i}F_i$$

where

A is at least one element selected from the group consisting of Lu, Gd, Sc, Y, La, Pr, Nd, Sm, Eu, Tb, Dy, Ho, Er, Tm, Yb, Me is at least one element selected from the group consisting of H, Li, Be, B, C, N, Na, Mg, Al, P, S, Cl, K, Ca, Ti, V, Cr, Mn, Fe, Co, Ni, Cu, Zn, Ga, Ge, As, Se, Rb, Sr, Zr, Nb, Mo, Ru, Rh, Pd, Ag, Cd, In, Sn, Sb, Cs, Ba, Hf; Ta, W, Re, Os, Ir, Pt, Au, Hg, Tl, Pb, Bi, U, Th, x is a value between $1\times10^{-4}$ f.u. and 0.2 f.u., y is a value between $1\times1^{-5}$ f.u. and 0.05 f.u., i is a value between $\times10^{-4}$ f.u. and 0.2 f.u.

4. Scintillating material according to claim 1, or 2, or 3, characterised in that the content of the $Ce^{3+}$ ions is within the range of 0.0005 f.u. to 0.1 f.u.

5. The wave-guide element made of scintillating material having the refractive index at the central zone higher than the one at the peripheral zone, characterised in that the wave-guide element is made of a single crystal scintillating material with the gradient of the refractive index by the section of the element.

6. The wave-guide element of claim 5 characterised in that its lateral surface is chemically polished.

* * * * *

UNITED STATES PATENT AND TRADEMARK OFFICE
CERTIFICATE OF CORRECTION

PATENT NO.    : 6,278,832 B1
DATED         : August 21, 2001
INVENTOR(S)   : Alexander Iosifovich Zagumennyi; Yury Dmitrievich Zavartsev; and Pavel Alekseevich Studenekin It is certified that error appears in the above-identified patent and that said Letters Patent is hereby corrected as shown below:

<u>Title page,</u>
Item "[22] PCT Filed:" delete "May 27, 1996" and insert -- May 27, 1998 --.

Signed and Sealed this

Twenty-sixth Day of February, 2002

*Attest:*

*Attesting Officer*

JAMES E. ROGAN
*Director of the United States Patent and Trademark Office*